(12) United States Patent
Matsuki

(10) Patent No.: US 7,911,114 B2
(45) Date of Patent: Mar. 22, 2011

(54) IMPACT DRIVE ACTUATOR

(75) Inventor: Kaoru Matsuki, Kawasaki (JP)

(73) Assignee: Olympus Corporation, Tokyo (JP)

( * ) Notice: Subject to any disclaimer, the term of this patent is extended or adjusted under 35 U.S.C. 154(b) by 607 days.

(21) Appl. No.: 11/443,637

(22) Filed: May 31, 2006

(65) Prior Publication Data

US 2006/0267450 A1 Nov. 30, 2006

(30) Foreign Application Priority Data

May 31, 2005 (JP) ................................. 2005-160651

(51) Int. Cl.
*H01L 41/04* (2006.01)
*H02N 2/04* (2006.01)
*H02N 1/04* (2006.01)

(52) U.S. Cl. ....................................... 310/328; 310/309

(58) Field of Classification Search .................. 310/309, 310/323.02, 328, 323.01, 323.03–323.21
See application file for complete search history.

(56) References Cited

U.S. PATENT DOCUMENTS

| 5,225,941 | A | 7/1993 | Saito et al. |
| 5,589,723 | A | 12/1996 | Yoshida et al. |
| 6,841,899 | B2 * | 1/2005 | Kaneko ........................... 310/12 |
| 2005/0242688 | A1 * | 11/2005 | Yuasa et al. ................... 310/328 |

* cited by examiner

*Primary Examiner* — Derek J Rosenau
(74) *Attorney, Agent, or Firm* — Scully, Scott, Murphy & Presser, P.C.

(57) ABSTRACT

An impact drive actuator comprises a fixing member, a vibrator, a vibrating member, a movable body, a drive circuit, and a friction adjustment section. The friction adjustment section includes a first electrode disposed on a surface of the movable body that faces the vibrating member and a second electrode disposed on a surface of the vibrating member that faces the movable body and electrically isolated from the first electrode. An electrostatic force is caused to act between the first and second electrodes to change an electrostatic force between the vibrating member and movable body so as to change the frictional force acting between the movable body and vibrating member.

4 Claims, 5 Drawing Sheets

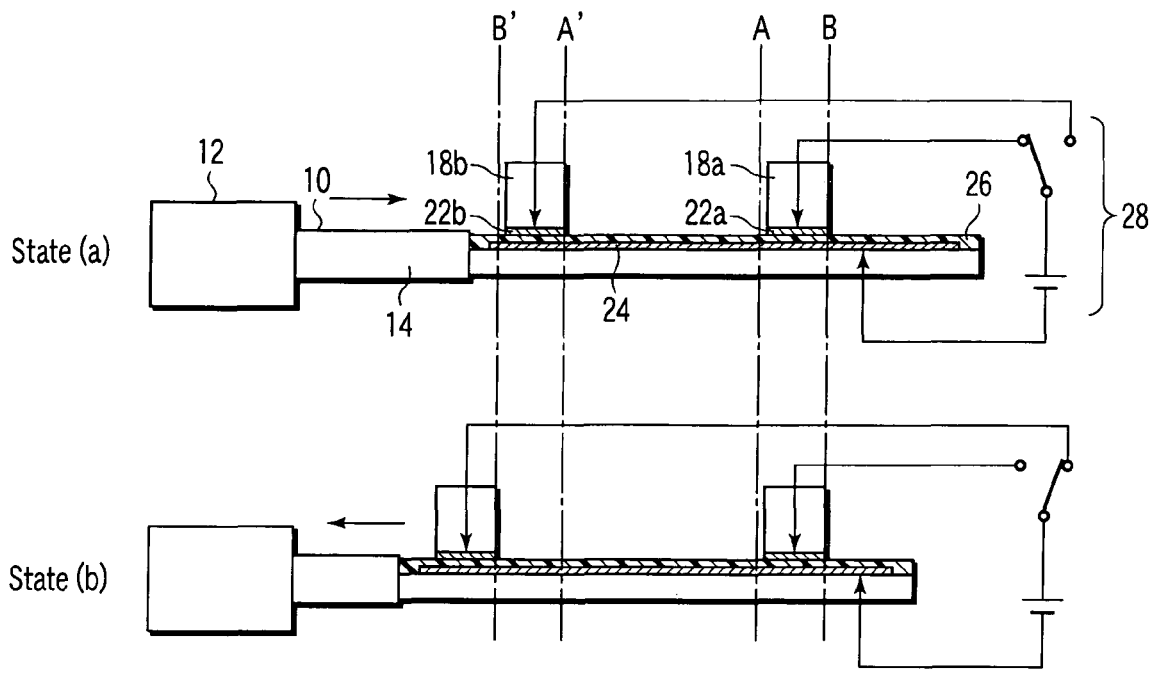
FIG. 9
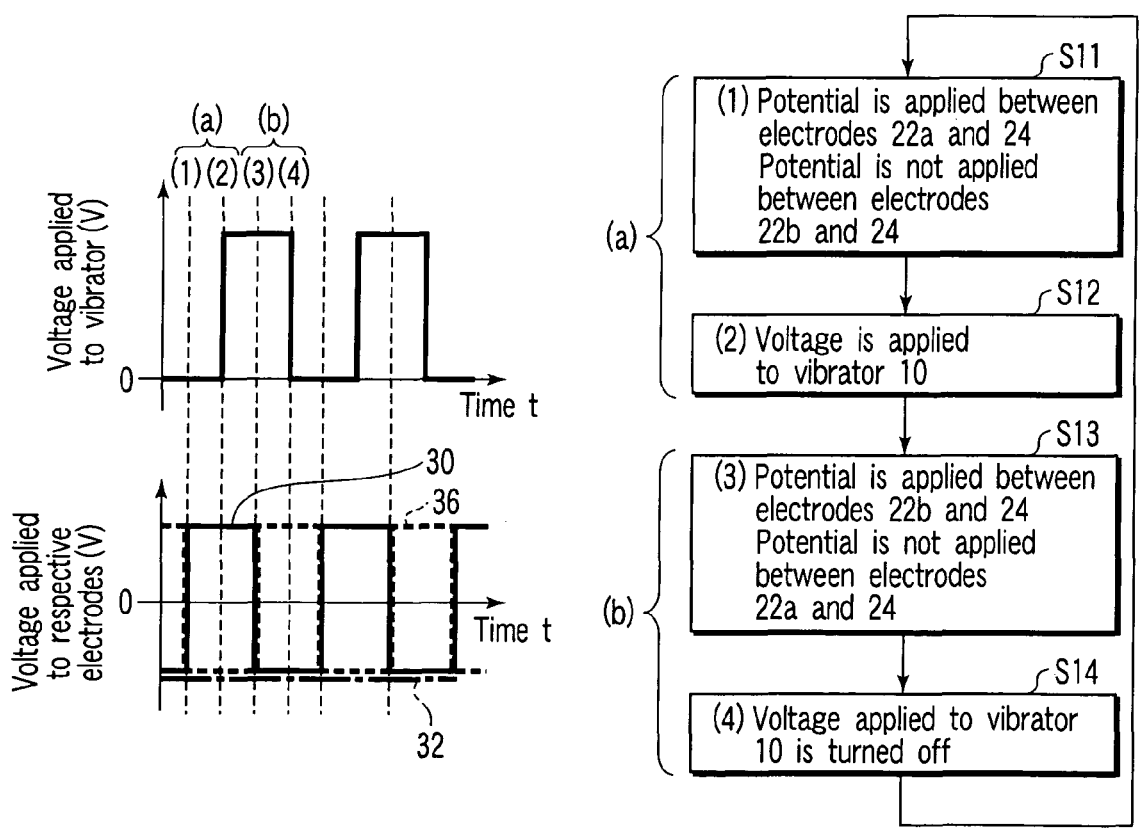
FIG. 10
FIG. 11

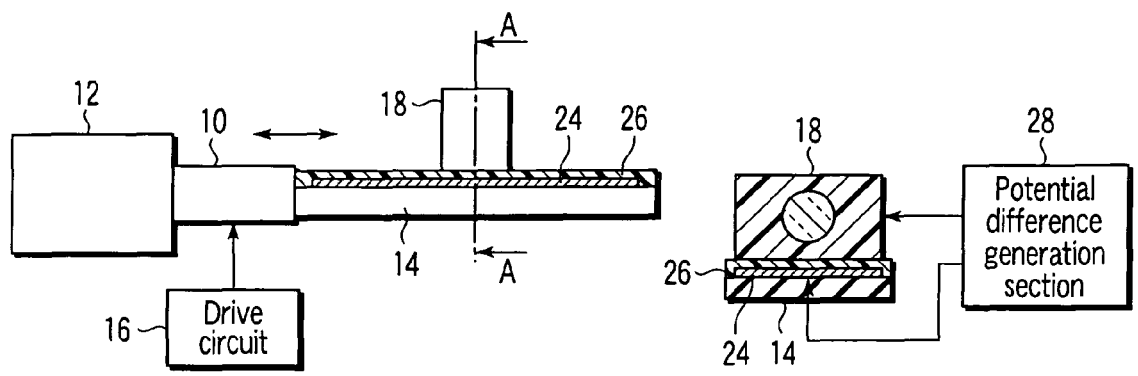
F I G. 12A            F I G. 12B
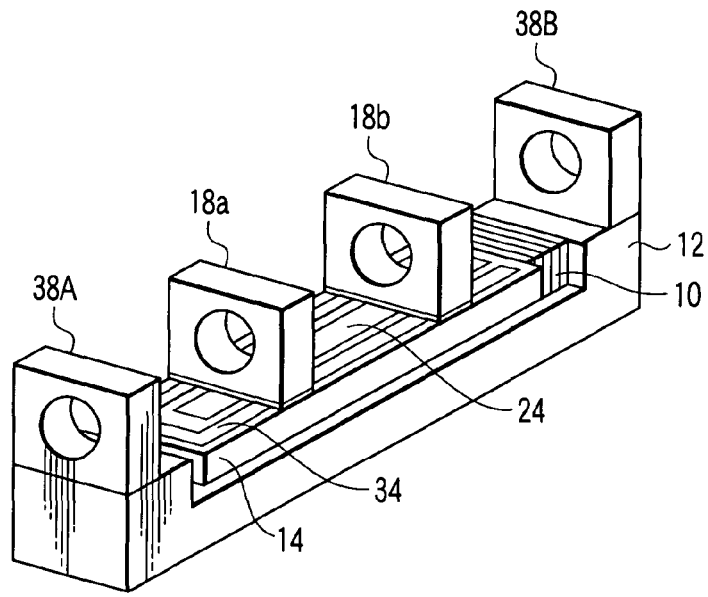
F I G. 13A
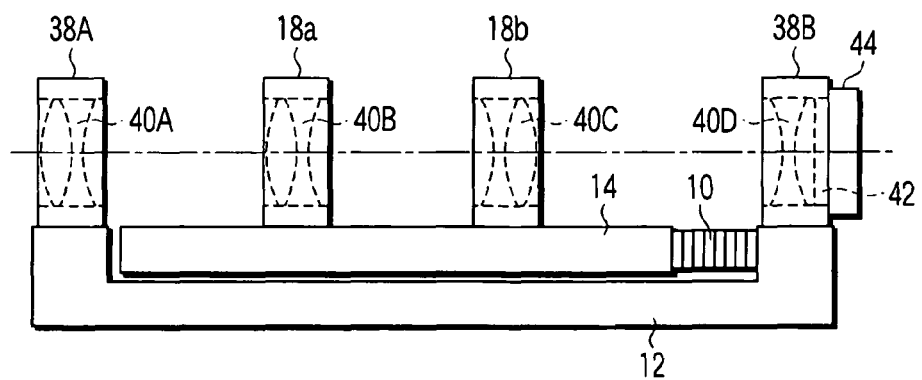
F I G. 13B

IMPACT DRIVE ACTUATOR

CROSS-REFERENCE TO RELATED APPLICATIONS

This application is based upon and claims the benefit of priority from prior Japanese Patent Application No. 2005-160651, filed May 31, 2005, the entire contents of which are incorporated herein by reference.

BACKGROUND OF THE INVENTION

1. Field of the Invention

The present invention relates to a compact impact drive actuator that stepwise drives a movable body.

2. Description of the Related Art

There is known an actuator that supplies a sawtooth wave drive pulse to an electromechanical conversion device coupled to a drive shaft to displace the drive shaft along its shaft to thereby move a movable member friction-coupled to the drive shaft along its shaft. Such an actuator is called an impact drive actuator.

The operation principle of the impact drive actuator will be described. The impact drive actuator has a vibrator whose one end is fixed to a fixing member and the other end thereof is attached to a vibrating member serving as a drive shaft. A movable body is friction-coupled to the vibrating member so as to be movable in the vibration direction of the vibrator. In such a configuration, a sawtooth wave drive pulse is applied to the vibrator.

More specifically, firstly, a gradually increased voltage is applied to the vibrator. The vibrator is then displaced and, at the same time, the vibrating member is displaced. The gradual displacement of the vibrator allows the movable body to be moved together with the vibrating member due to friction with the vibrating member. Secondly, a rapidly reduced voltage is applied to the vibrator. The position of the vibrator is then returned to the original position and, at the same time, the vibrating member rapidly returns to its own initial position. At this time, slippage is caused between the movable body and vibrating member, so that the movable body stays at the same position. By applying the sawtooth wave drive pulse including a gradually increased voltage and rapidly reduced voltage to the vibrator as described above, the movable body is moved from one point to another. When the above operation is repeated, the movable body can intermittently be moved relative to the fixing member. To move the movable body in the reverse direction, a sawtooth wave drive pulse including a rapidly increased voltage and gradually reduced voltage is applied to the vibrator.

An actuator that uses the above drive principle is disclosed in U.S. Pat. No. 5,225,941. In this patent, the impact drive actuator is applied to a camera lens drive mechanism. A movable body serving as a lens barrel is fitted to a vibrating member. Further, an elastic member having a bent portion is attached to the movable body at the fitting portion. In this case, the bent portion of the elastic member is brought into pressure contact with the vibrating member to generate an adequate frictional force.

Another example is disclosed in U.S. Pat. No. 5,589,723. In an actuator disclosed in this patent, a friction adjuster including a vibrator is used for a portion that generates friction. By synchronizing a voltage applied to the generator of the friction adjuster and a voltage applied to a vibrator for displacing a vibrating member with each other, an appropriate frictional force for a movable body to be moved is obtained.

BRIEF SUMMARY OF THE INVENTION

According to an aspect of the present invention, there is provided an impact drive actuator comprising:
a fixing member;
a vibrator having a first end fixed to the fixing member and a second end configured to expand and contract;
a vibrating member fixed to the second end of the vibrator and configured to be movable in the expansion and contraction direction of the vibrator;
a movable body disposed on the vibrating member and configured to be movable in a desirable direction relative to the fixing member;
a drive circuit configured to supply a drive signal whose value changes at a predetermined cycle to the vibrator for causing the vibrator to be displaced; and
a friction adjustment section configured to change a frictional force acting between the movable body and vibrating member,
the friction adjustment section including:
a first electrode disposed on a surface of the movable body that faces the vibrating member; and
a second electrode disposed on a surface of the vibrating member that faces the movable body and electrically isolated from the first electrode,
an electrostatic force being caused to act between the first and second electrodes to change an electrostatic force between the vibrating member and movable body so as to change the frictional force acting between the movable body and vibrating member.

According to another aspect of the present invention, there is provided an impact drive actuator comprising:
a fixing member;
displacement generation means having a first end fixed to the fixing member and a second end configured to expand and contract;
a vibrating member, fixed to the second end of the displacement generation means, for being movable in the expansion and contraction direction of the displacement generation means;
a movable body, disposed on the vibrating member, for being movable in a desirable direction relative to the fixing member;
drive means for supplying a drive signal whose value changes at a predetermined cycle to the displacement generation means for causing the displacement generation means to be displaced; and
friction adjustment means for changing a frictional force acting between the movable body and vibrating member,
the friction adjustment means including:
a first electrode disposed on a surface of the movable body that faces the vibrating member; and
a second electrode disposed on a surface of the vibrating member that faces the movable body and electrically isolated from the first electrode,
an electrostatic force being caused to act between the first and second electrodes to change an electrostatic force between the vibrating member and movable body so as to change the frictional force acting between the movable body and vibrating member.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a view showing a displacement state of an impact drive actuator according to a third embodiment;

FIG. 10 is a view showing the waveform of a drive signal from a drive circuit and waveform of an application voltage from a potential difference generation section in the impact drive actuator according to the third embodiment;

FIG. 11 is a control flowchart of the impact drive actuator according to the third embodiment;

FIG. 12A is a side view of an impact drive actuator according to a fourth embodiment of the present invention;

FIG. 12B is a cross-sectional view taken along the A-A line of FIG. 12A;

FIG. 13A is a perspective view of an image capturing module according to a fifth embodiment of the present invention; and FIG. 13B is a side view of the image capturing module according to the fifth embodiment.

DETAILED DESCRIPTION OF THE INVENTION

Preferred embodiments of the present invention will be described below with reference to the accompanying drawings.

First Embodiment

Figure 1A:
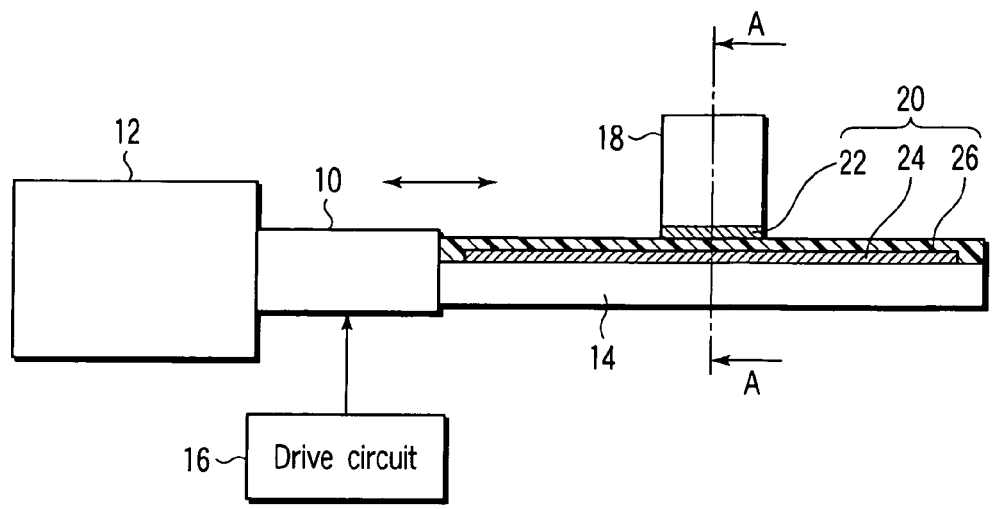
FIG. 1A is a side view of an impact drive actuator according to a first embodiment of the present invention.
Figure 1B:
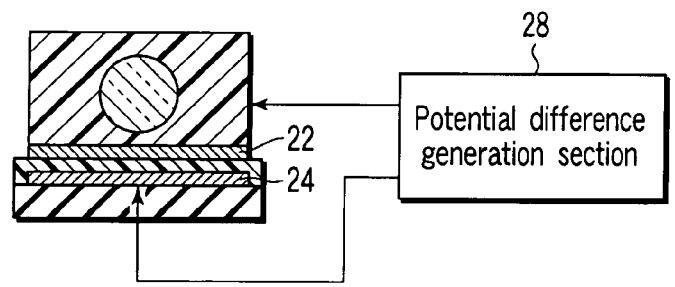
FIG. 1B is a cross-sectional view taken along the A-A line of FIG. 1A.

As shown in FIGS. 1A and 1B, in an impact drive actuator according to a first embodiment, one end of a vibrator (e.g., a piezoelectric element) 10 is fixed to a fixing member 12. Attached to the other end of the vibrator 10 is a vibrating member 14. In this configuration, the vibrator 10 is displaced by a voltage supplied from a drive circuit 16 to the vibrator 10 and the vibrating member 14 is correspondingly displaced. A movable body 18 is so disposed on the vibrating member 14 as to be movable in a predetermined direction relative to the fixing member 12.

A friction adjustment member 20 includes a first electrode 22, a second electrode 24, and an insulator 26. In FIG. 1A, in order to make a configuration of the friction adjustment member 20 clearer, only the relevant portion is shown in a cross-sectional view. The first electrode 22 is disposed on a surface of the movable body 18 that faces the vibrating member 14. The second electrode 24 is disposed on a surface of the vibrating member 14 that faces the movable body 18. That is, the first and second electrodes 22 and 24 face each other through the insulator 26. When a potential difference is applied between the first and second electrodes 22 and 24 from a potential difference generation section 28, an electrostatic force is generated by which a friction force acting between the movable body 18 and vibrating member 14 can be changed.

A guide mechanism or the like may be provided for preventing the movable body 18 from being moved in the directions other than the displacement direction of the vibrator 10.

Figure 2:
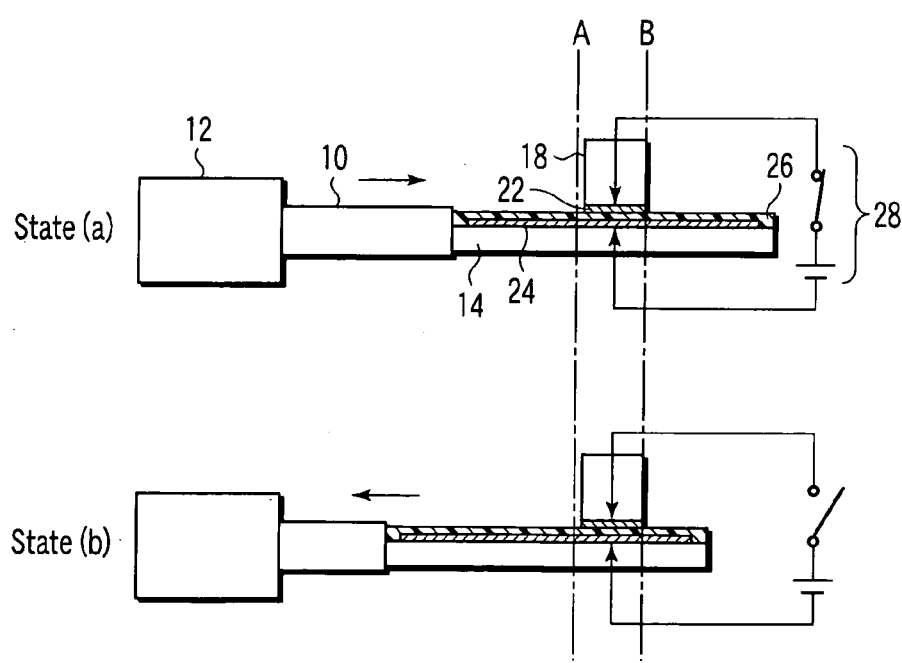
FIG. 2 is a view showing a displacement state of the impact drive actuator according to the first embodiment.
Figure 3:
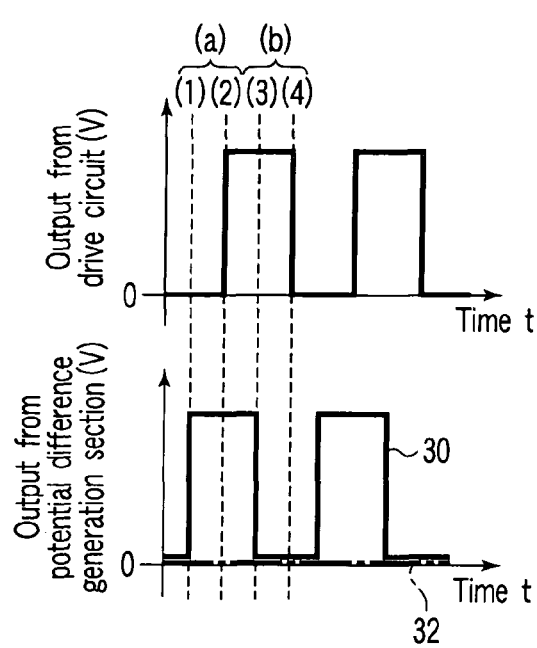
FIG. 3 is a view showing the waveform of a drive signal from a drive circuit and waveform of an application voltage from a potential difference generation section in the impact drive actuator according to the first embodiment.
Figure 4:
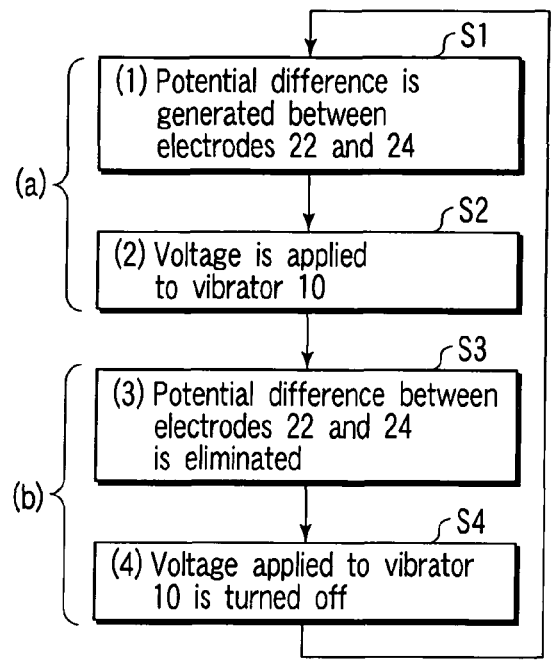
FIG. 4 is a control flowchart of the impact drive actuator according to the first embodiment.

A method of driving the impact drive actuator according to the first embodiment will next be described with reference to FIGS. 2, 3, and 4. Note that (1) to (4) of FIG. 3 correspond to (1) to (4) of FIG. 4 respectively, and (a) and (b) of FIG. 2 correspond to (a) and (b) of FIGS. 3 and 4 respectively. In FIG. 2, the potential difference generation section 28 is shown as an equivalent circuit including a DC power source and a switch. In FIG. 3, the waveform of a voltage applied to the first electrode 22 is denoted by a solid line 30 and waveform of a voltage applied to the second electrode 24 is denoted by a dot-and-dash line 32. Although the solid line 30 and dot-and-dash line 32 are not overlapped with each other at their low state, for clarification of the drawing, they both exhibit a GND (0V) potential represented as the horizontal line.

At time (1), a positive potential is applied to the first electrode 22 and a GND (0V) potential is applied to the second electrode 24 by the potential difference generation section 28 to thereby generate an electrostatic attractive force between the first and second electrodes 22 and 24 (step S1).

In this state, at time (2), a positive voltage is applied from the drive circuit 16 to the vibrator 10 (step S2). Then, as shown in a state (a) of FIG. 2, the vibrator 10 rapidly expands in the right direction and, correspondingly, the vibrating member 14 moves to the right. At this time, a frictional force is caused by an electrostatic attractive force acting between the first and second electrodes 22 and 24, so that the movable body 18 moves to the right together with the movement of the vibrating member 14.

At time (3), 0V is applied to the first and second electrodes 22 and 24 in a state where the vibrator 10 expands in the right direction as described above to eliminate the electrostatic attractive force (step S3). At time (4), the voltage applied to the vibrator 10 is turned off (step S4). Then, as shown in a state (b) of FIG. 2, the vibrator 10 rapidly contracts and, correspondingly, the vibrating member 14 moves in the left direction. At this time, there is no frictional force between the first and second electrodes 22 and 24, so that slippage is caused to allow the movable body 18 to stay at the same position.

As described above, according to the first embodiment, the first and second electrodes 22 and 24 are provided as the friction adjustment member 20, so that the friction adjustment member 20 does not protrude from the movable body 18, i.e., it is possible to set the friction adjustment member 20 in the impact drive actuator. Therefore, it is possible to realize space-saving to thereby reduce the size of the impact drive actuator. Further, it is possible to give a frictional force by giving a potential difference between the electrodes 22 and 24, so that impact drive can be achieved without changing the displacement speed of the vibrator 10 between reciprocations thereof. This eliminates the need for the drive circuit 16 to generate two kinds of waveforms for forward and backward passages, thereby simplifying the structure of the drive circuit 16 itself.

In order to move the movable body 18 in an arbitrary direction, a voltage applied to the second electrode 24 is set to a constant value (0V) and a voltage applied to the first electrode 22 is generated by changing over the DC power source and switch based on the timing of a drive signal supplied from the drive circuit 16.

Figure 5:
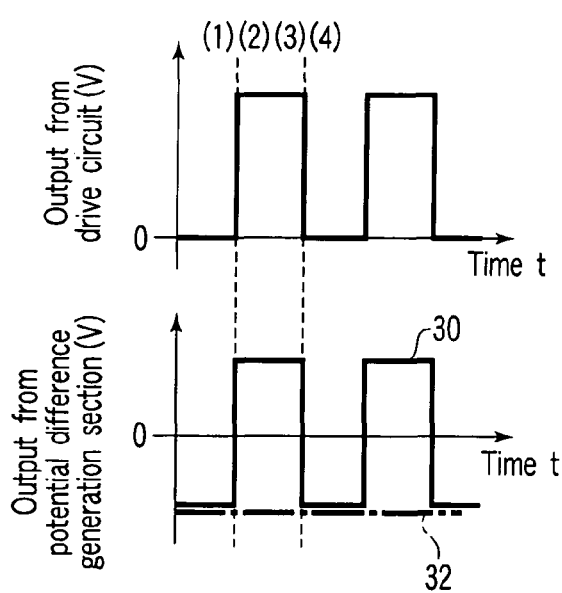
FIG. 5 is a view showing a case where the rising edge of a drive signal has the same phase as the rising edge or falling edge of a voltage waveform.

In this case, as shown in FIG. 3, the relative phase between a voltage applied to the vibrator 10 and a voltage applied to the first electrode 22 is about 90°. However, the phase between the above voltages is not limited to this, and it is possible to achieve stable operation unless the rising edge of the drive signal has the same phase as the rising edge or falling edge of the voltage waveform as shown in FIG. 5.

Figure 6:
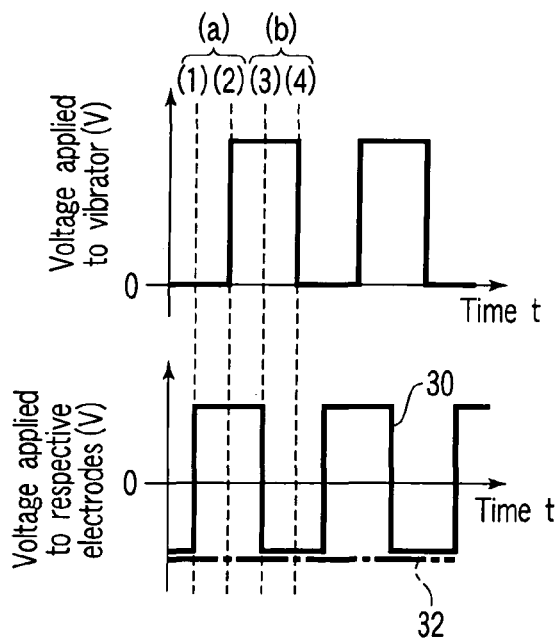
FIG. 6 is a view showing the waveform of a drive signal from a drive circuit and waveform of an application voltage from a potential difference generation section in a first modification of the impact drive actuator according to the first embodiment.

There is a fear that dynamic friction between the movable body 18 and vibrating member 14 occurs when slippage is caused between them to cause frictional wear. To reduce the frictional wear, in a first modification of the impact drive actuator according to the first embodiment, a voltage applied to the second electrode 24 is set to a constant negative value, and a voltage applied to the first electrode 22 is set so as to change between positive and negative values, as shown in FIG. 6. Therefore, when there is a potential difference, an electrostatic attractive force acts, as in the case of the first embodiment; on the other hand, when there is no potential difference, voltages having the same polarity are applied to develop an electrostatic repulsion force to reduce a frictional force between the movable body 18 and vibrating member 14.

Figure 7:
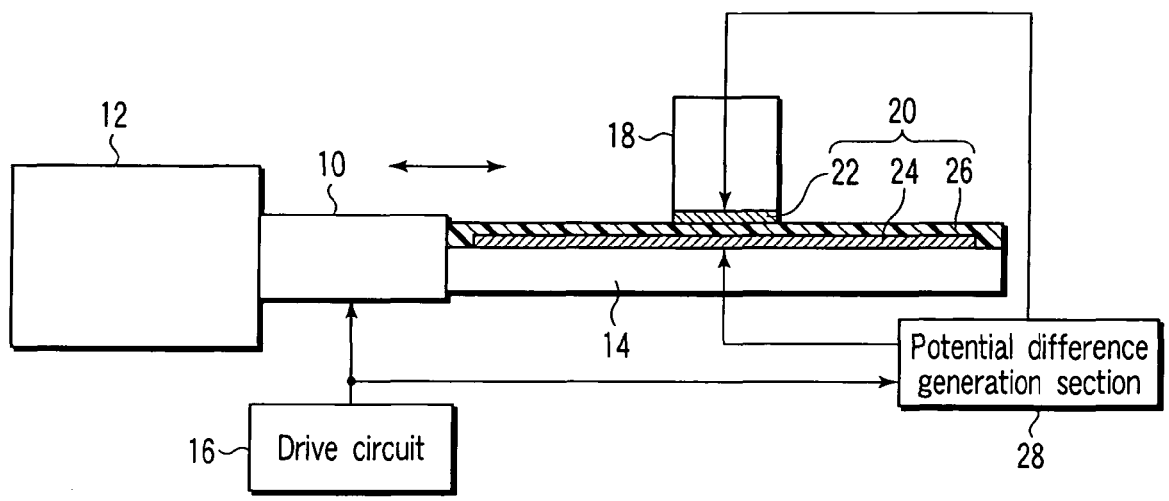
FIG. 7 is a second modification of the impact drive actuator according to the first embodiment.

A mechanism of a second modification of the impact drive actuator according to the first embodiment is the same as that of the first embodiment. However, as shown in FIG. 7, an output from the potential difference generation section 28 is created using a signal output from the drive circuit 16. For example, a phase shifter (not shown) is provided in the potential difference generation section 28. The phase shifter is used to change the phase of a drive signal from the drive circuit 16 to the phase such as one of the output signal from the potential difference generation section 28 shown in FIG. 6, and the phase-changed drive signal is applied to the first electrode 22. This allows the actuator of the second modification to operate stably. Therefore, a pulse circuit need not be incorporated in the potential difference generation section 28, realizing a size reduction of the circuit.

Second Embodiment

Figure 8A:
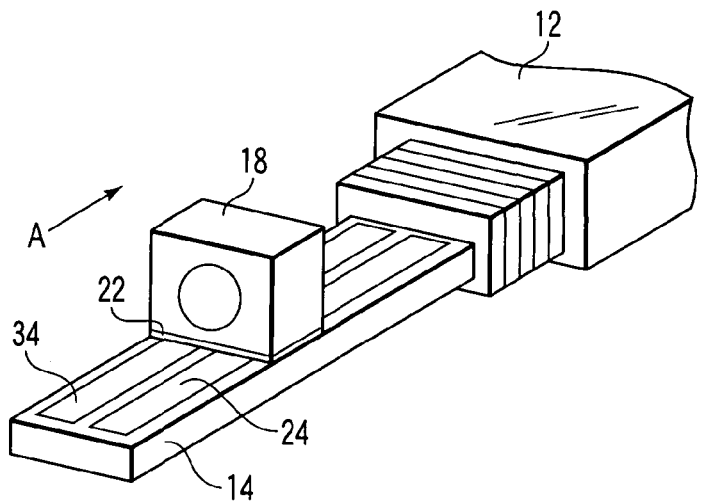
FIG. 8A is a perspective view showing a configuration of an impact drive actuator according to a second embodiment of the present invention.
Figure 8B:
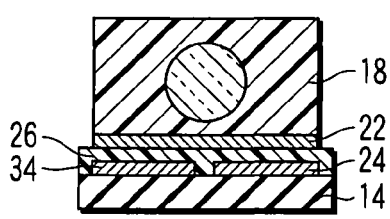
FIG. 8B is a cross-sectional view as viewed from the point A of FIG. 8A.
Figure 8C:
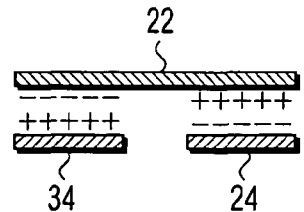
FIG. 8C is an extracted view showing an electrode part of FIG. 8B.

As shown in FIGS. 8A, 8B, and 8C, in an impact drive actuator according to a second embodiment, a third electrode 34 is disposed on the vibrating member 14 in addition to the second electrode 24. For clarification, the second and third electrodes 24 and 34, which are not actually visible due to existence of the insulator 26, are denoted by solid lines in FIG. 8A.

When a positive charge is applied to the third electrode 34, a negative charge is caused on a surface (left side of the first electrode 22 in FIGS. 8B and 8C) of the first electrode 22 that faces the third electrode 34 due to electrostatic induction. When the negative charge is caused on the left side of the first electrode 22 as described above, a positive charge is induced on the right side of the first electrode 22. As shown in FIGS. 8B and 8C, the second electrode 24 is provided on the surface facing the right side of the first electrode 22 and a negative charge is applied to the second electrode 24, so that a positive charge is easily induced on the right side of the first electrode 22. Therefore, an electrostatic attractive force is generated between these opposite surfaces, with the result that friction is caused between the movable body 18 and vibrating member 14.

As described above, in the impact drive actuator according to the second embodiment, an electrostatic attractive force is generated using electrostatic induction caused by a voltage applied to the third electrode 34. This eliminates the need to provide a wiring to the first electrode 22, simplifying the structure. As a result, it is possible not only to easily realize a size reduction but also to obtain stable operation owing to the absence of the need for wiring to the movable body 18.

Also in the second embodiment, impact drive can be achieved without changing the displacement speed of the vibrator 10 between reciprocations thereof, which eliminates the need for the drive circuit 16 to generate two kinds of waveforms for forward and backward passages, thereby simplifying the structure of the drive circuit 16 itself.

Further, as in the case of the first embodiment, in order to move the movable body 18 in an arbitrary direction, a voltage applied to the second electrode 24 is set to a constant value (0V) and a voltage applied to the third electrode 34 is generated by changing over the DC power source and switch based on the timing of a drive signal supplied from the drive circuit 16. Further, a phase shifter may be provided in the potential difference generation section 28 to change the phase of a drive signal and the phase-changed drive signal is applied to the third electrode 34. This allows the actuator of the second embodiment to operate stably. Therefore, a pulse circuit need not be incorporated in the potential difference generation section 28, realizing a size reduction of the circuit.

Further, also in the second embodiment, while the relative phase between a voltage applied to the vibrator 10 and a voltage applied to the third electrode 34 is about 90°, the phase between the above voltages is not limited to this, and it is possible to achieve stable operation unless the rising edge of the drive signal has the same phase as the rising edge or falling edge of the voltage waveform.

Third Embodiment

As shown in FIG. 9, in an impact drive actuator according to a third embodiment of the present invention, two movable bodies 18a and 18b are disposed on the vibrating member 14. A first electrode 22a is provided for the movable body 18a and a first electrode 22b is provided for the movable body 18b.

As shown in FIGS. 10 and 11, at time (1), a potential is applied between the first electrode 22a of the movable body 18a and second electrode 24; whereas a potential is not applied between the first electrode 22b of the movable body 18b and second electrode 24 (step S11). In FIG. 10, the waveform of a voltage applied to the first electrode 22a of the movable body 18a is denoted by a solid line 30, the waveform of a voltage applied to the first electrode 22b of the movable body 18b is denoted by a broken line 36, and the waveform of a voltage applied to the second electrode 24 is denoted by a dot-and-dash line 32.

In this state, at time (2), a positive voltage is applied from the drive circuit 16 to the vibrator 10 to cause the vibrator 10 to rapidly expand in the right direction (step 12). Then, as shown in a state (a) of FIG. 9, an attractive force acts on the movable body 18a to which a potential difference is given to allow the movable body 18a to move together with the vibrating member 14. On the other hand, the movable body 18b to which a potential difference is not given stays at the same position.

To the contrary, at time (3), a potential difference is applied between the first electrode 22b of the movable body 18b and second electrode 24; whereas a potential difference is not applied between the first electrode 22a of the movable body 18a and second electrode 24 (step S13). At time (4), when the voltage applied to the vibrator 10 is turned off, the vibrator 10 rapidly contracts (step S14). Then, as shown in a state (b) of FIG. 9, the movable body 18a stays at the same position; whereas the movable body 18b moves in the left direction together with the vibrating member 14.

With the above configuration, it is possible to realize space-saving to thereby reduce the size of the impact drive actuator, as in the case of the first embodiment. Further, it is possible to move a plurality of movable bodies 18a and 18b in an independent manner. Further, also in the third embodiment, while the relative phase between a voltage applied to the vibrator 10 and voltage applied to the first electrode 22a or 22b is about 90°, as in the case where only one movable body is used, the phase between the above voltages is not limited to this, and it is possible to achieve stable operation unless the rising edge of the drive signal has the same phase as the rising edge or falling edge of the voltage waveform.

Fourth Embodiment

As shown in FIGS. 12A and 12B, an impact drive actuator according to the fourth embodiment has the same configuration as that of the first embodiment. A different point from FIGS. 1A and 1B is that an electrically conductive material is used as the movable body 18 and the movable body 18 serves also as the first electrode.

Therefore, in the fourth embodiment, an electrode need not be formed in the movable body 18 and it is possible to obtain friction between the movable body 18 and vibrating member 14 with a simpler structure.

Fifth Embodiment

The impact drive actuators according to the above first to fourth embodiments of the present invention can be configured to be a specific-purpose module, e.g., an image capturing module by combining it with other members. An example of such a specific-purpose module will be described as a fifth embodiment of the present invention.

FIGS. 13A and 13B show an image capturing module using the impact drive actuator according to the third embodiment. The image capturing module has movable bodies 18a and 18b each serving as a lens frame and lens frames 38A and 38B fixed respectively to the front and rear portions of a fixing member 12. A first lens group 40A, second lens group 40B, third lens group 40C, and fourth lens group 40D are fixed respectively to the lens frame 38A, movable body 18a, movable body 18b, and lens frame 38B. A low-pass filter 42 and an image sensor 44 are fixed behind the fourth lens group 40D. Although not shown, as in the case of the third embodiment, an electrostatic attractive force is controlled using the first electrodes 22a, 22b and second electrode 24 to thereby drive the two lens groups 40B and 40C of the movable bodies 18a and 18b in an independent manner. For clarification, the second and third electrodes 24 and 34, which are not actually visible due to existence of the insulator 26, are denoted by solid lines in FIG. 13A.

As described above, the first to fourth lens groups 40A to 40D can constitute a very compact zoom optical system in which the image sensor 44 serves as a focal plane and the second and third lens groups 40B and 40C serve as movable groups.

While a lens group is fixed to the movable body 18 in the fifth embodiment, various optical devices such as an image sensor, a prism, or a mirror may be fixed to the movable body 18. Similarly, various optical devices may be fixed to the fixing member 12.

While the present invention has been described based on the above embodiments, it is a matter of course that the invention is not limited to the above embodiments and various modifications or applications can be carried out within a range of the scope of the invention.

For example, while a potential is applied to the respective movable bodies 18 by controlling changeover operation of the DC power source and switch in the above embodiments, a means for changing the phase of a voltage from the drive circuit 16 may be provided in the potential difference generation section 28. In this case, a plurality of movable bodies 18 can be controlled more easily.

In the case where the mass and size of the vibrating member 14 are much smaller than those of the vibrator 10 (piezoelectric element, etc.), a voltage supplied from the drive circuit 16 can be reduced to a low level by driving the vibrating member 14 at the resonance frequency of the vibrator 10. To the contrary, in the case where the mass and size of the vibrator 10 are much smaller than those of the vibrating member 14, a voltage supplied from the drive circuit 16 can be reduced to a low level by driving the vibrator 10 at the resonance frequency of the vibrating member 14. Further, in the case where the vibrating member 14 and vibrator 10 have the same mass and size, the vibrator 10 is driven at the resonance frequency of a system constituted by the two.

The vibrator 10 is not limited to the piezoelectric element, but an electrostatic, electromagnetic, or magnetostrictive actuator may be used.

Additional advantages and modifications will readily occur to those skilled in the art. Therefore, the invention in its broader aspects is not limited to the specific details, representative devices shown and described herein. Accordingly, various modifications may be made without departing from the spirit or scope of the general inventive concept as defined by the appended claims and their equivalents.

What is claimed is:

1. An impact drive actuator comprising:
   a fixing member;
   a vibrator having a first end fixed to the fixing member and a second end configured to expand and contract;
   a vibrating member fixed to the second end of the vibrator and configured to be movable in the expansion and contraction direction of the vibrator;
   a movable body disposed on the vibrating member and configured to be movable in a desirable direction relative to the fixing member;
   a drive circuit configured to supply a drive signal whose value changes at a predetermined cycle to the vibrator for causing the vibrator to be displaced; and a friction adjustment section configured to change a frictional force acting between the movable body and vibrating member, the friction adjustment section including:
- a first electrode disposed on a surface of the movable body that faces the vibrating member; and
- a single second electrode disposed on a surface of the vibrating member that faces the first electrode and is electrically isolated from the first electrode, an electrostatic force being caused to act between the first and second electrodes to change an electrostatic force between the vibrating member and movable body at a time of expansion and contraction of the vibrator by which an inertial force is acted on the movable body, and the frictional force acting between the movable body and the vibrating member is changed, thereby relatively moving the movable body in a desirable direction with respect to the fixing member;

wherein a third electrode is disposed on a surface of the vibrating member that faces the moving body and a potential difference is applied between the second and third electrodes to generate the electrostatic force between the first and second electrodes.

2. The actuator according to claim 1, further comprising: a potential difference generation section configured to apply a voltage whose value changes at a predetermined cycle to one of the second and third electrodes and to apply a fixed voltage to the other.

3. The actuator according to claim 2, wherein the potential difference generation section is configured to apply a predetermined phase to the drive signal from the drive circuit to generate the voltage.

4. The actuator according to claim 3, wherein the phase difference between the voltage output from the potential difference generation section and drive signal includes any angle other than 0° and 180°.

* * * * *